(12) United States Patent
Blanchard

(10) Patent No.: US 12,701,011 B2
(45) Date of Patent: Aug. 4, 2026

(54) METHOD AND SYSTEM FOR PERFORMING CELL OPERATIONS USING A VERIFIABLE DATA STRUCTURE

(71) Applicant: THRIVE BIOSCIENCE, INC., Wakefield, MA (US)

(72) Inventor: Alan Blanchard, Wakefield, MA (US)

(73) Assignee: THRIVE BIOSCIENCE, INC., Wakefield, MA (US)

( * ) Notice: Subject to any disclaimer, the term of this patent is extended or adjusted under 35 U.S.C. 154(b) by 206 days.

(21) Appl. No.: 18/285,985

(22) PCT Filed: Apr. 7, 2022

(86) PCT No.: PCT/US2022/023770
§ 371 (c)(1),
(2) Date: Oct. 6, 2023

(87) PCT Pub. No.: WO2022/216894
PCT Pub. Date: Oct. 13, 2022

(65) Prior Publication Data
US 2024/0214210 A1 Jun. 27, 2024

Related U.S. Application Data

(60) Provisional application No. 63/171,679, filed on Apr. 7, 2021.

(51) Int. Cl.
H04L 29/06 (2006.01)
H04L 9/08 (2006.01)
H04L 9/32 (2006.01)

(52) U.S. Cl.
CPC .......... H04L 9/3236 (2013.01); H04L 9/0825 (2013.01); H04L 9/3297 (2013.01)

(58) Field of Classification Search
None
See application file for complete search history.

(56) References Cited

U.S. PATENT DOCUMENTS

| | | | |
|---|---|---|---|
| 2018/0082043 A1 * | 3/2018 | Witchey | ................ G16H 10/40 |
| 2020/0133956 A1 | 4/2020 | Cannon et al. | |
| 2020/0136831 A1 * | 4/2020 | Danielson | ............. H04L 9/3247 |
| 2020/0402167 A1 * | 12/2020 | Grube | .................. H04L 9/3239 |

* cited by examiner

*Primary Examiner* — Andrew J Steinle
(74) *Attorney, Agent, or Firm* — Norris McLaughlin, PA

(57) ABSTRACT

A method and system for performing operations on cells in an instrument wherein the performance of operations on cell samples is controlled and data relating to the operations is generated, a unique identifier is associated with the instrument, the generated data is encrypted with a key corresponding to the unique identifier and a hash of one of the generated data and the encrypted generated data is created to enable verification of the integrity thereof. The hash is stored for later verification of data.

34 Claims, 6 Drawing Sheets

METHOD AND SYSTEM FOR PERFORMING CELL OPERATIONS USING A VERIFIABLE DATA STRUCTURE

PRIORITY CLAIM

This application is a 371 of International Patent Application No. PCT/US2022/023770, filed Apr. 7, 2022, which claims priority of U.S. Provisional Application Ser. No. 63/171,679, filed Apr. 7, 2021, the contents of which are hereby incorporated herein by reference.

FIELD OF TECHNOLOGY

The present disclosure generally relates to an instrument for performing operations on cells and for the storing of data relating thereto and more specifically to a method and system for verifying the authenticity of the data using a verifiable data structure such as a blockchain data structure.

BACKGROUND

Verifiable data integrity protective services have been known for many years. One example is Surety, LLC that describes its AbsoluteProof Service using the ISO/IEC 18014-3 and ANSI X9.95 Trusted Time Stamp Standard to verify the integrity of data. In this process, a data file is hashed and a time stamp is attached to it where the hash and time stamp is archived. In addition, the hash value of all of the hashes for a particular week are published in the New York Times to confirm the authenticity of Surety's records. A copy of the AbsoluteProof datasheet at http://surety.com/Portals/0/datasheets/AbsoluteProof-Overview-2011.pdf is incorporated herein by reference. Since the date of each issue of the New York Times is included with the newspaper and it is wide circulated and maintained in libraries, the owner of the data can provide the original data, create a hash and compare it to the hash published in the New York Times and establish that the data was known to the party on that date of publication.

Another time stamping service is an accreditation from the Japan Data Communications Association (JADAC). Three types of services are accredited: (1) time-stamps using digital signatures, (2) time-stamps using archiving, and (3) time-stamps using linking mechanisms.

Another existing technology that can be used to verify the integrity of data is blockchain technology. An example of implementation and the corresponding blockchain techniques are described in a 2008 article by Satoshi Nakamoto titled "Bitcoin: A Peer-to-Peer Electronic Cash System," the entire contents of which are hereby incorporated by reference. A blockchain is a distributed database system (sometimes called a public ledger) that records transactions between a source identifier and a destination identifier. These identifiers are created through cryptography such as, for example, public key cryptography. For example, a user may create a destination identifier based on a private key. The relationship between the private key and the destination identifier provides a proof that the user is associated with the data from a corresponding transaction. The decentralized nature of the blockchain can also be advantageous because no single node or system is the arbiter of the correctness of the data. Instead, the decentralized system as a whole determines what is the correct data using a consensus mechanism.

A blockchain creates a history of data, messages, or transactions in a series of blocks where each block contains a mathematical summary, called a hash, of the previous block. In a proof of work consensus mechanism, miners must calculate a nonce, that is a number added to the hash which is less than a particular value defined by the software. When that nonce is found and a majority of the other miners agree, the block is added to a chain. This process creates a chain where any changes made to a previously formed block will change the hash of that block, which would require that the nonce be recomputed. Given the difficulty of the nonce calculation, it is virtually impossible to change data stored in earlier blocks of the chain. This immutability and the fact that the blockchain is stored in a distributed manner in nodes in a peer-to-peer network, is sufficient to verify the authenticity of the data stored in the blockchain data structure.

Instruments for performing operations on cells and in particular cell cultures, such as incubators, centrifuges, counters, imagers, and refrigerators are known. Many of these devices produce data relating to the cell operations that they perform.

One disadvantage of the current state of the art is that the integrity of the data produced by such instruments is sometimes open to question.

SUMMARY

One object of the present invention is to provide methods and systems for verifying the integrity of data produced by instruments for performing cell operations.

One embodiment is a method for performing operations on cells in an instrument comprising the steps of controlling the performance of operations on cell samples wherein data relating to the operations is generated, associating a unique identifier with the instrument, encrypting the generated data with a key corresponding to the unique identifier, creating a hash of one of the generated data and the encrypted generated data to enable verification of the integrity thereof, and storing the hash for later verification of data.

In some embodiments, the unique identifier is a public key of a public key/private key pair and wherein the step of encrypting is performed using the private key. In one embodiment, the instrument includes one or more processors and read only memories and wherein the private key is derived from data stored in the read only memories. For example, if there are three ROMs, each includes a portion of the private key. In another embodiment, the private key is stored remotely and supplied to the instrument for encryption.

In some embodiments, a time stamp is provided and combined with the hash for the verification of the integrity of data. In some embodiments, the step of controlling is according to at least one protocol and wherein metadata is hashed. In some embodiments, the generated data includes image data, the generated data includes metadata, the metadata includes cell line identification data, and/or the metadata includes user identification data.

In some embodiments, a blockchain network is used to store the timestamp and hash, the time stamp, encrypted data and the hash, and/or a hash of the encrypted data and timestamp. In some embodiments, the hash of the data is published in a widely circulated and dated publication, such as a private publication or a government publication.

In some embodiments, the instrument is a cell culture instrument, and the hash is transmitted by a network interface. In an embodiment, the private key is derived from data stored in a secure element.

Other embodiments include an instrument for performing operations on cells and having a unique identifier associated therewith, the instrument comprising at least one processor controlling the performance of operations on cell samples wherein data relating to the operations is generated and wherein the at least one processor is configured to encrypt the generated data with a key corresponding to the unique identifier, hash one of the generated data and the encrypted data to enable verification of the integrity thereof and store the hash for later verification of data.

In some embodiments, the unique identifier is a public key of a public key/private key pair and wherein the encrypting is performed using the private key. In one embodiment, the instrument includes one or more processors and read only memories and wherein the private key is derived from data stored in the read only memories. For example, if there are three ROMs, each includes a portion of the private key. In another embodiment, the private key is stored remotely and supplied to the instrument for encryption.

In some embodiments, a time stamp is provided and combined with the hash for the verification of the integrity of data. In some embodiments, the controlling is according to at least one protocol and wherein metadata is hashed. In some embodiments, the generated data includes image data, the generated data includes metadata, the metadata includes cell line identification data, and/or the metadata includes user identification data.

In some embodiments, a blockchain network is used to store the timestamp and hash, the time stamp, encrypted data and the hash, and/or a hash of the encrypted data and timestamp. In some embodiments, the hash of the data is published in a widely circulated and dated publication, such as a private publication or a government publication. It would be possible for private or governmental entities to provide this service, as long at the hash of the data includes a timestamp, is sufficiently widely circulated and archived. With services such as the Internet Archive or Wayback Machine, the publication could be published on the Internet and maintained in the Internet Archive.

In some embodiments, the instrument is a cell culture instrument, and the hash is transmitted by a network interface. In an embodiment, the private key is derived from data stored in a secure element.

Another object of the invention is to keep the private key out of the hands of the instrument user to further verify the integrity of the data.

Some embodiments include a method for encrypting data in an instrument having a plurality of processors for performing operations on cells using a private key of a public key/private key pair, comprising the steps of providing seed data in a memory of each processor, when at least one of the processors requires the private key, deriving the private key from the seed data from all of the processors and thereafter encrypting the data with the private key.

In another embodiment, the public key/private key pair hierarchical deterministic keys generated from a seed that is remotely stored from the instrument. Each time data is to be stored in a data structure such as a blockchain, a new public key/private key pair is generated and supplied to the instrument. The private key is only good for the current data to be stored and thus cannot be used for future data storage.

Some embodiments include a system for encrypting data in an instrument for performing operations on cells using a private key of a public key/private key pair, comprising a plurality of processors, each having an associated memory and configured to obtain seed data from its associated memory when at least one of the processors requires the private key, deriving the private key from the seed data from all of the processors and thereafter the at least one of the processors encrypting the data with the private key.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. Various embodiments of the invention will now be described, by way of example, with reference to the accompanying drawings, in which.

DETAILED DESCRIPTION

Figure 1:
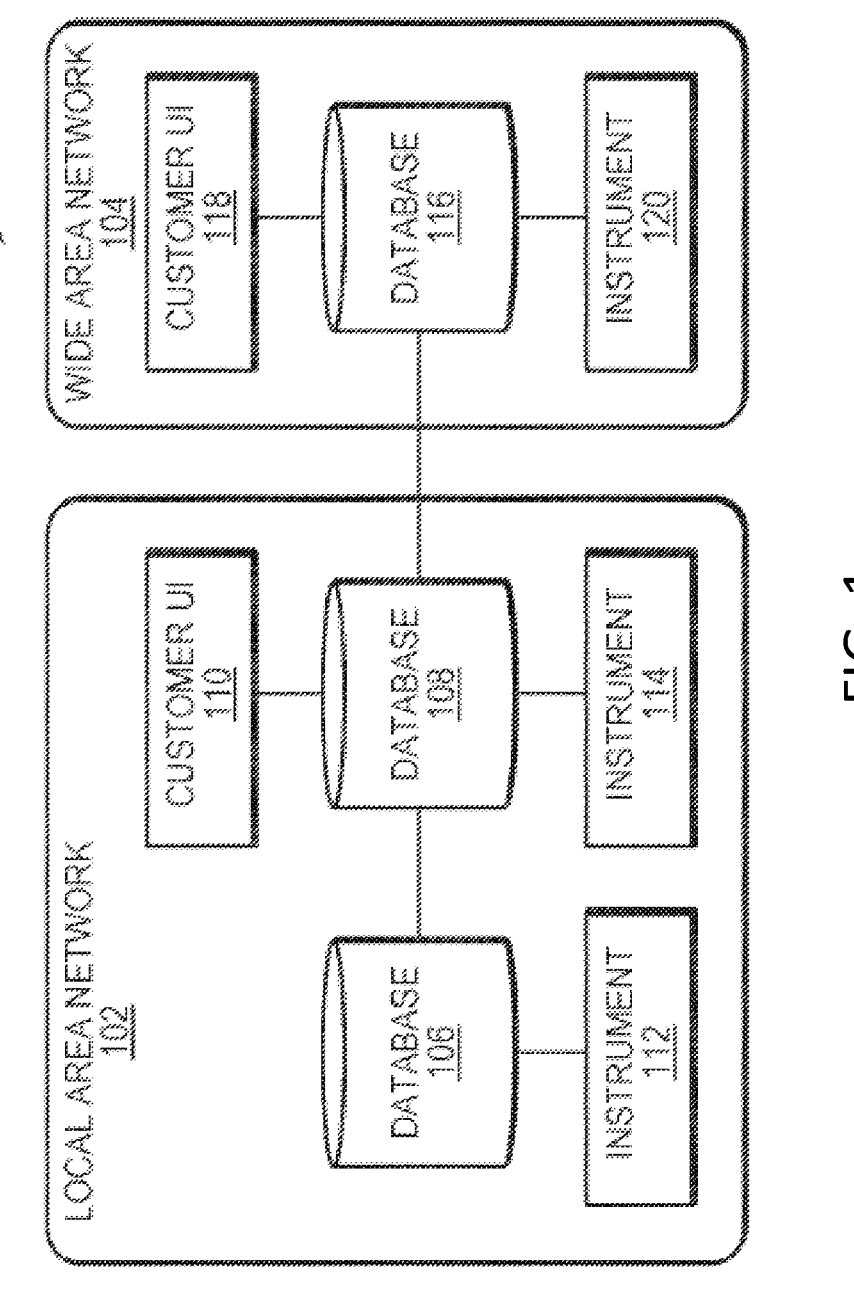
FIG. 1 illustrates the system architecture of networked instruments in accordance with one embodiment.

Aspects of the disclosure relate to instruments of performing cell operations and in particular to automated incubators that enable productive long-term cell culture. Some cell culture incubators are equipped with a control system, a network interface, a non-transient storage, and one or more electrically controllable resources. These incubators may include a variety of such components, such as but not limited to sensors, environmental control systems, fluidics transport systems, robotics, etc., which may operate together at the direction of a computer, processor, microcontroller or other computing device. The control system controls the cell culture incubator and automatically monitors and adjusts cell culture conditions for optimal growth of the cell culture.

The control system can be programmed with a variety of protocols stored in the non-transitory storage medium, manually entered by an operator, or retrieved from an external data source using the network interface. Each protocol describes how the control system should operate the electrically controllable resources to incubate a particular cell line or culture. Each individual protocol will have its own duration, which may itself vary during execution, depending on the protocol's purpose.

Protocols may be shared directly among network-enabled cell culture incubators in a peer-to-peer arrangement or indirectly using, e.g., a hub-and-spoke type arrangement with a centralized repository or database. Protocols may also be stored for later reuse by the same network-enabled cell culture incubator. A protocol that is executed by one incubator may be manually or automatically associated with various metadata describing various aspects of the protocol, including but not limited to incubator type, cell type, date of run, time of run, whether the run concluded successfully, conditional steps performed by the run, etc., to facilitate future storage, retrieval, indexing, and search. The association of a protocol with various items of metadata may itself be semi-automated by copying some or all of the metadata associated with a similar protocol.

A protocol that is executed by one incubator may be manually or automatically associated with various metadata describing various aspects of the protocol, including but not limited to incubator type, cell type, date of run, time of run, whether the run concluded successfully, conditional steps performed by the run, etc., to facilitate future storage, retrieval, indexing, and search. The association of a protocol with various items of metadata may itself be semi-automated by copying some or all of the metadata associated with a similar protocol.

As a protocol executes, a variety of systems may collect various forms of data concerning the execution of the protocol. Examples of collected data include ambient environmental data (temperature, gas levels, humidity, etc.), sampled sensor data (pH; images of cells, wells, etc., using various imaging modes at various resolutions, etc.), values derived from image data (e.g., cell proliferation estimates, cell morphology, stem cell colony growth, etc.), other raw and processed data (e.g., flow cytometry, various other assays), and additional protocol-related data (which parts of the incubator are used, when they are used, how long they are used for; what volume of liquids are dispensed, when they are dispensed; bar code scans of various plates and consumables as they move through the incubator, etc.).

As with protocols, each data set may be manually or automatically associated with various metadata describing various aspects of the data set, including but not limited to incubator type, cell type, date of run, time of run, whether the run concluded successfully, conditional steps performed by the run, protocol executed, protocol parameters used, instruments used, instrument components used, etc., to facilitate future storage, retrieval, indexing, and search. The data collection processes may be automated, e.g., by the protocol, manually specified, or both. The association of a data set with various items of metadata may itself be semi-automated by copying some or all of the metadata associated with a similar data set.

One or more control systems may be interconnected by one or more networks in any suitable form, including as a local area network (LAN) or a wide area network (WAN) such as an enterprise network or the Internet. Such networks may be based on any suitable technology and may operate according to any suitable protocol and may include wireless networks, wired networks, or fiber optic networks.

The various methods or processes outlined herein may be coded as software that is executable on one or more processors that employ any one of a variety of operating systems or platforms. Such software may be written using any of a number of suitable programming languages and/or programming or scripting tools and may be compiled as executable machine language code or intermediate code that is executed on a framework or virtual machine.

One or more algorithms for controlling methods or processes provided herein may be embodied as a readable storage medium (or multiple readable media) (e.g., a non-volatile computer memory, one or more floppy discs, compact discs (CD), optical discs, digital versatile disks (DVD), magnetic tapes, flash memories, circuit configurations in Field Programmable Gate Arrays or other semiconductor devices, or other tangible storage medium) encoded with one or more programs that, when executed on one or more computing units or other processors, perform methods that implement the various methods or processes described herein.

In various embodiments, a computer readable storage medium may retain information for a sufficient time to provide computer-executable instructions in a non-transitory form. Such a computer readable storage medium or media can be transportable, such that the program or programs stored thereon can be loaded onto one or more different computing units or other processors to implement various aspects of the methods or processes described herein. As used herein, the term "computer-readable storage medium" encompasses only a computer-readable medium that can be considered to be a manufacture (e.g., article of manufacture) or a machine. Alternatively or additionally, methods or processes described herein may be embodied as a computer readable medium other than a computer-readable storage medium, such as a propagating signal.

The terms "program" or "software" are used herein in a generic sense to refer to any type of code or set of executable instructions that can be employed to program a computing unit or other processor to implement various aspects of the methods or processes described herein. Additionally, it should be appreciated that according to one aspect of this embodiment, one or more programs that when executed perform a method or process described herein need not reside on a single computing unit or processor but may be distributed in a modular fashion amongst a number of different computing units or processors to implement various procedures or operations.

Executable instructions may be in many forms, such as program modules, executed by one or more computing units or other devices. Generally, program modules include routines, programs, objects, components, data structures, etc., that perform particular tasks or implement particular abstract data types. Typically, the functionality of the program modules may be organized as desired in various embodiments.

Turning to the figures, FIG. 1 illustrates a system 100 of networked instruments in accordance with one embodiment. The system 100 may include one or more of a local area network 102 (LAN; e.g., an Intranet) and/or a wide area network 104 (WAN; e.g., the Internet). As can be seen, the LAN 102 and the WAN 104 may be in operable communication with each other.

The LAN 102 may include databases 106 and 108. Although the LAN 102 is illustrated as including two databases, the LAN 102 may include any number of databases that may store a variety of types of data and in a variety of different formats.

The databases may or may not be in communication with user interfaces. For example, database 108 may be in operable communication with a customer user interface 110. The customer user interface 110 may allow users to query the databases for information such as data related to operation of one or more instruments. The customer user interface 110 may then present the information to the user.

The databases 106 and 108 may be in further communication with instruments 112 and 114, respectively. These instruments 112 and 114 may be a cell culture incubator device or any type of component included with or otherwise used in conjunction with an incubator device. Although the LAN 102 is illustrated as including two instruments, the LAN 102 may include any number of instruments. Additionally, a particular database may be in operable communication with any number of instruments.

The WAN 104 may also include one or more databases 116. The database 116 may be similar in configuration to databases 106 and 108. The database 116 may also be in operable communication with a customer user interface 118. The customer user interface may be similar in configuration to the customer user interface 110 of the LAN 102 and may allow a user to request and receive data stored in the database 116. The WAN 104 may also include or otherwise be in communication with one or more instruments 120. The instrument 120 may be similar in configuration to the instruments 112 and 114 of the LAN 102.

The customer user interfaces 110 and 118 may be any sort of interface that allows one or more users to input commands, data, queries, or other types of information that may relate to one or more instruments and operations. The customer user interfaces 110 and 118 may be configured as, for example and without limitation, PCs, laptops, mobile phones, tablets, smartwatches, or any other devices that may receive information from and present information to users. For example, users may input instructions for one or more instruments and/or receive data related to operation of one or more instruments.

Examples of output devices that can be used to provide a user interface include printers or display screens for visual presentation of output, and speakers or other sound generating devices for audible presentation of output. Examples of input devices that can be used for a user interface include keyboards and pointing devices, such as mice, touchpads, and digitizing tablets. In other examples, a computer may receive input information through speech recognition or in another audible format, through visible gestures, through haptic input (e.g., including vibrations, tactile and/or other forces), or any combination thereof.

The databases may be configured as structured or non-structured databases and may be located in an incubator's non-transitory storage or remotely in a network accessible storage (e.g., NAS, SAN, etc.). The databases may permit entire data sets, partial data sets, individual entries in a data set, or the like, to be retrieved using a specified index value or a range of values. The data sets may also be stored with a hosted service provided by, e.g., a web-accessible server, thereby enabling data set sharing among networked incubators.

Figure 2:
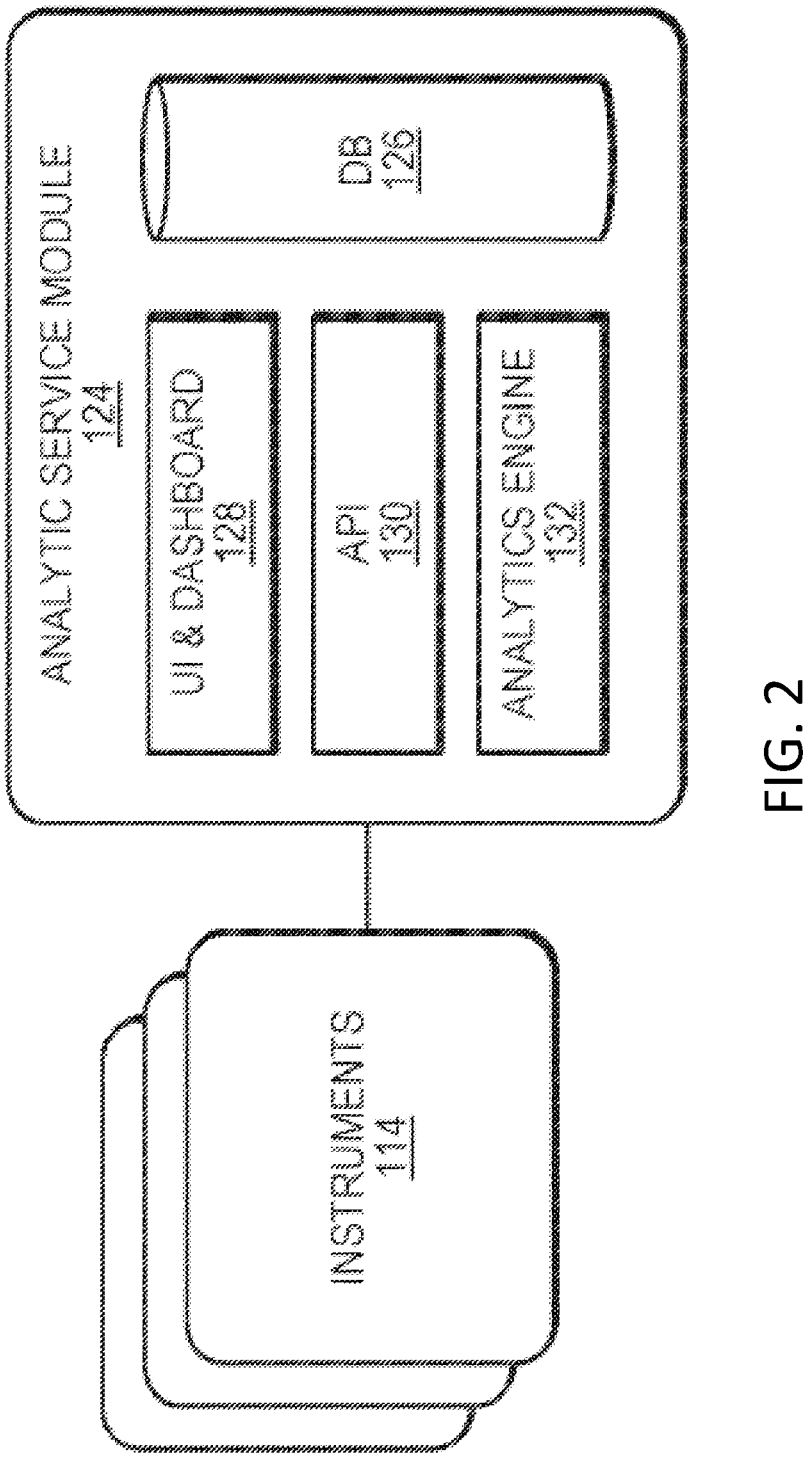
FIG. 2 illustrates multiple instruments of FIG. 1 in operable communication with an analytics module in accordance with one embodiment.

FIG. 2 illustrates an exemplary embodiment in which one or more instruments 114 are in operable communication with an analytic service module 124. The service module 124 may include or otherwise be in communication with a database 126 such as the databases 106, 108, or 116 of FIG. 1. The analytic service module 124 may further include a user interface and dashboard component 128, an application programming interface (API) 130, and an analytics engine 132.

In operation, the analytic service module 124 may issue commands to one or more instruments 114 regarding tasks to be performed. For example, a user such as a lab worker may input instructions via the user interface and dashboard 128 which are communicated to the appropriate instrument 114 via the API 130. The analytics engine 132 may gather, analyze, and present data regarding the instruments' operation in performing various assigned tasks. This data may be shared amongst other instruments and/or stored in the database 126. Accordingly, multiple instruments may communicate with each other and the analytics engine 132 may analyze, process, and communicate data regarding instrument operations.

Figure 3:
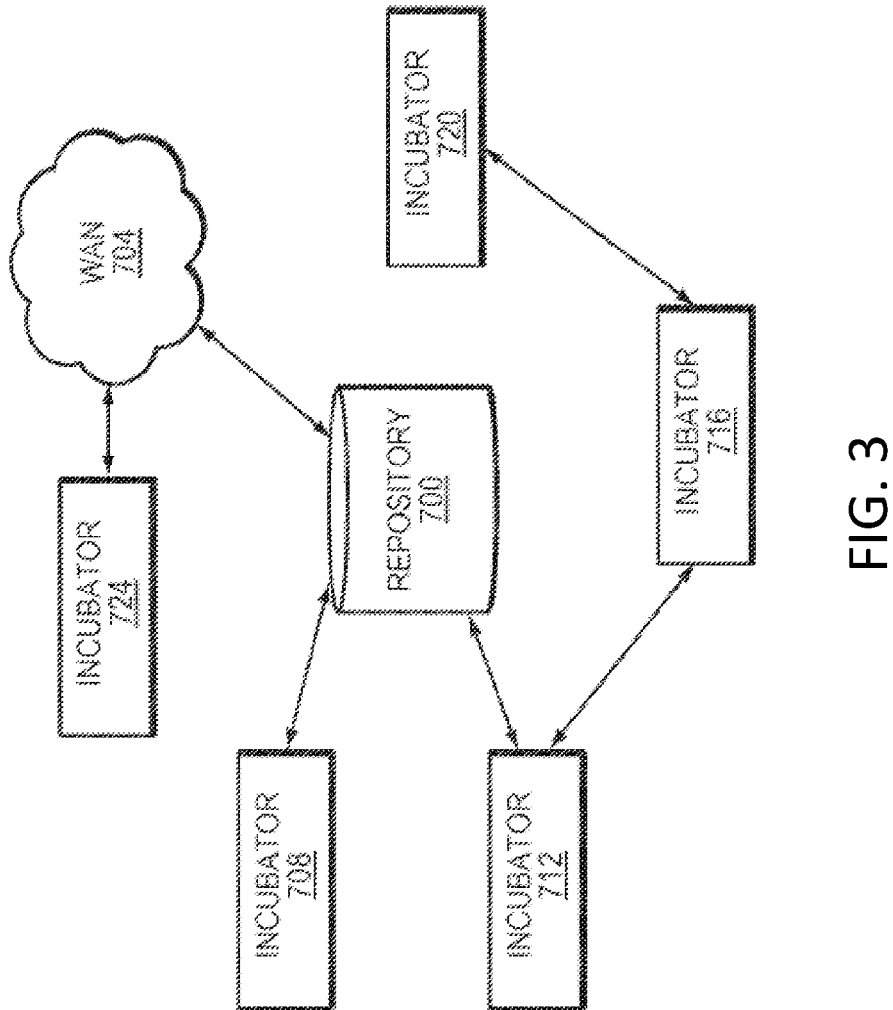
FIG. 3 illustrates a plurality of network-enabled cell culture incubators interoperating in accordance with one embodiment.

FIG. 3 depicts a plurality of network-connected incubators 708-724 interacting so as to share various data sets, including but not limited to protocol, protocol results, associated metadata, etc. Sharing data sets permits individual incubators to share protocols, improve protocol operations, make recommendations to individual human operators concerning protocol execution, reanalyze prior runs, etc. Each incubator may also store its own protocols and data sets for later reuse by that same incubator (not shown).

In some embodiments, the incubators 708-724 may be interconnected with other incubators and or network accessible data stores via LAN or WAN. The incubators may transmit various shared data sets (protocols, parameters, results, other metadata, etc.) to other incubators or these data stores to facilitate study and reuse of these data sets. The data stores may themselves share data sets to further facilitate study and reuse of the data sets.

As the data sets become more widely shared, either directly between incubators or indirectly using the data stores, individual incubators can use this shared data to improve protocol execution and outcomes. Individual incubators can rely exclusively on this shared data or utilize the shared data in combination with data local to the incubator, in some embodiments interacting with a plurality of shared data sources as if were a single shared data source.

The repository 700 may be a network-enabled data store, such as a NAS, SAN, network-enabled RAID array, web-hosted storage service (e.g., AWS), relational or object-oriented or other database, that permits data to be stored and retrieved by one or more devices using various network communications. Repository 700 is connected to one or more incubators (e.g., incubator 708) via local area network connections (e.g., Ethernet, Token Ring, etc.) and one or more incubators (e.g., incubator 724) via wide area network connections (e.g., Internet or WAN 704). For example, the protocol may allow for the specification of various parameters that determine the data sets retrieved from a repository 700.

Incubator 708 is directly connected to repository 700, permitting incubator 708 to transmit various shared data sets to the repository 700 and retrieve various data sets from the repository 700 by providing a query with various parameters specifying the data sets of interest.

Incubator 712 is, like incubator 708, directly connected to the repository 700 and indirectly connected to incubator 508 by way of repository 700. Incubator 712 can transmit various data sets to the repository 700 and retrieve various data sets from the repository 700 by providing a query with various parameters specifying the data sets of interest. Incubator 712 can also transmit various data sets to the incubator 708 and retrieve various data sets from the incubator 708 by providing a query with various parameters specifying the data sets of interest to be relayed by repository 700.

Incubators 712, 716, and 720 are interconnected in a peer-to-peer configuration. This arrangement allows each of the incubators to share data sets with each other, transmitting data sets to and retrieving data sets from connected incubators as if one of the connected incubators is a repository. Since incubator 712 is also connected to repository 700, incubators 716 and 720 can communicate with repository 700 as well as repository-connected incubator 708.

Incubator 724 is connected to repository 700 via WAN 704, permitting incubator 724 to transmit various shared data sets to the repository 700 and retrieve various data sets from the repository 700 by providing a query with various parameters specifying the data sets of interest via the WAN 704.

Individual incubators can selectively choose the shared data that they receive or the received shared data that they use by specifying various selection parameters that may be relevant to the protocol presently executing (or to be executed) on the incubator. The shared data sets may be filtered to exclude those data entries that do not satisfy the relevant selection parameters.

The incubators 708-724 may utilize the shared data as it received or it may use various derived values thereof (e.g., statistical derivatives, compilations, deep learning networks, etc.) in the protocols that it executes. For example, a shared data set may detail the typical time it takes for a certain kind of cells to grow under certain conditions from their current state to requiring passaging, permitting a protocol to predict that the current culture of those cells will require passaging in, e.g., 10 hours, scheduling appropriate imaging and image analysis for that timeframe. If the current culture is not ready for passaging by that time, the operator may be alerted. If the imaging system indicates that the cells are fully disassociated in an unusual amount of time, the imaging system may reimage the culture, image a different area of the well, issue an alert to a user or another system, etc.

The incubators and/or shared data sources may use shared data sets from one incubator to reanalyze and reinterpret prior runs from the same or another incubator, especially images. Shared data sets may also be analyzed and used to recommend choices and options to an operator, e.g., which media to use for a particular cell line.

Protocols and data sets may be anonymized prior to sharing, making it difficult or impossible for third parties to determine the original source (i.e., author or incubator) of the protocol or the data set. The anonymization process may be performed by the original incubator prior to the transmission of the protocol or dataset, by the repository 700 hosting the protocol or the data set for sharing, etc.

Each protocol may include a variety of conditional actions, i.e., actions triggered upon the satisfaction of a particular condition. Examples of such conditions include, but are not limited to, a value meeting a particular value or falling within a particular range, the result of an automated or semi-automated analytical technique (e.g., image analysis, pH measurement, etc.), the result of a command received via a user interface from an operator, etc. In various embodiments particular values of interest include absolute time, relative time, elapsed time, etc. The threshold values or ranges of interest may be programmed in advance or derived in an automated manner from various data sets, such as previous runs of the protocol currently being executed, or other protocols executed in connection with the particular cell type of interest. Examples of such actions may include the operation of a particular piece of electrically controllable equipment; the execution of another protocol, such as a sub-protocol or a replacement protocol; the communication of various information to an operator or a computing unit. In various embodiments, a human operator or a computing unit may alter the stored protocol to address various operating conditions or constraints.

In some embodiments, information related to the operation of the incubator (e.g., temperature, humidity, gas composition, images, cell culture conditions, etc., or any combination thereof) can be obtained from one or more sensors associated with the incubator (e.g., located within the incubator cabinet, located within the incubator but outside the incubator cabinet, located in proximity to the incubator and in electrical communication with the incubator or an associated computing unit, etc.), and can be stored in computer-readable media to provide information about conditions during a cell culture incubation. In some embodiments, the computer-readable media comprises a database. In some embodiments, said database contains data from a single incubator. In some embodiments, said database contains data from a plurality of incubators. In some embodiments, data is stored subject to various security mechanisms and protocols that render it resistant to unauthorized access and manipulation. In some embodiments, all data generated by the incubator(s) and related facilities are stored. In some embodiments, a subset of that data is stored.

The blockchain network 30' can be an existing (public or private) distributed network formed from a plurality of nodes or computers, for example. According to the exemplary aspect, the blockchain network maintains a continuously-growing list of immutable data records and is composed of data structure blocks that exclusively hold the data received from the instruments. In particular, after the instrument creates hash values of the data files and transmits such hash values to the blockchain network, the transaction in the blockchain records blocks and confirm when and in what sequence the data transactions enter and are logged in the existing blockchain. Preferably, every node in the decentralized system has a copy of the blockchain. This design avoids the need to have a centralized database managed by a trusted third party. Moreover, each of the nodes can validate the data, add hash values to their copy of the blockchain and then broadcast these additions to other nodes in accordance with the blockchain used.

Each transaction (or a block of transactions) can be incorporated or included into the blockchain via a proof-of-work mining process, a proof of stake process or other consensus mechanisms. The mining process suggested by Nakamoto involves solving a computationally difficult problem that is also easy to verify. For example, each node (instruments and/or miners) may attempt to "mine" a solution to the hash of a block or a transaction. Hashes create an abridged version of the data with a fixed length. The proof of work process involves adding a nonce value to the data which produces a hash value with a required number of leading zeros.

Each node that is part of the distributed computer system may also keep a copy or a portion of the blockchain in storage (e.g., on disk or in RAM) that is local to the corresponding node.

In certain examples, the private keys for each participant are different. Alternatively, the private keys for each participant may be shared. For example, if a private blockchain used as blockchain, then the entity controlling the blockchain may use the same private key for all participant identifiers.

A digital wallet is software and hardware (or specifically designed hardware) that allows a participant or user to generate and/or digitally sign blockchain transactions. The digital wallet can include a private key (e.g., that is known to the participant or user that the digital wallet is associated with) and a series of identifiers (sometimes call digital wallet identifiers, walletIDs, blockchain identifiers, etc. . . . ) that have been generated based on the private key. These identifiers are used to allow other users to "send" blockchain transactions, which are recorded on the blockchain, to that identifier. Such software may then present a holistic view of what data results are originated by the holder of the digital wallet.

It will be appreciated that the nature of the information included as part of the blockchain may be based on specific application needs. For example, regulatory or contract needs may require the specification of certain data fields, while others are excluded. In certain examples, the information contained in the blockchain may include a token or unique identifier that acts to point to an internal database maintained by a centralized computer system. As the information regarding the transactions are part of a publicly available distributed ledger of the blockchain, independent parties (e.g., auditors, regulatory agencies) can verify and see the nature of the transaction that has occurred.

In certain example embodiments, a smart contract may be integrated (e.g., entirely) into the blockchain system. In this type of implementation, the "contract" may be tied to a blockchain address that is capable of receiving and holding assets. The assets (e.g., digital tokens, shares, digital currency) may be released or transferred upon satisfaction of specific conditions defined by the contract.

In embodiments, a public key cryptography feature may be resolved to carry-out the access request with respect to the blockchain database. The public key cryptography feature may include a cryptographic system that utilizes a pair of keys to authenticate and encrypt a portion of data. In embodiments, the public key cryptography feature may include a first key (e.g., public key widely known by multiple users) used to encrypt a portion of data, and a second key (e.g., private key known only to the recipient of the data) to decipher the encrypted portion of data. In embodiments, the public key cryptography feature may be used to verify the authenticity of the access request. In embodiments, resolving the public key cryptography feature may include utilizing a first key (e.g., public key) of a first user (e.g., sender of the authentication request) to encrypt the access request, transmitting the encrypted access request to the blockchain database, and subsequently utilizing a second key (e.g., private key) to decrypt the access request and perform it with respect to the blockchain database.

In embodiments, a private key cryptography feature may be resolved to carry-out the access request with respect to the blockchain database. The private key cryptography feature (e.g., also referred to as secret-key encryption or symmetric encryption) may include a cryptographic system that utilizes a single key for authentication and encryption of a portion of data. The key may include a secret or private key that is known only to a few users (e.g., the sender and recipient of the message). The private key cryptography feature may be used to verify the authenticity (e.g., veracity, credibility) of the access request. In embodiments, resolving the private key cryptography feature may include using the private key to encrypt the access request prior to transmission from a first user, transmitting the encrypted access request to the blockchain database, and subsequently utilizing the private key to decrypt the access request and perform it with respect to the blockchain database.

Figure 4:
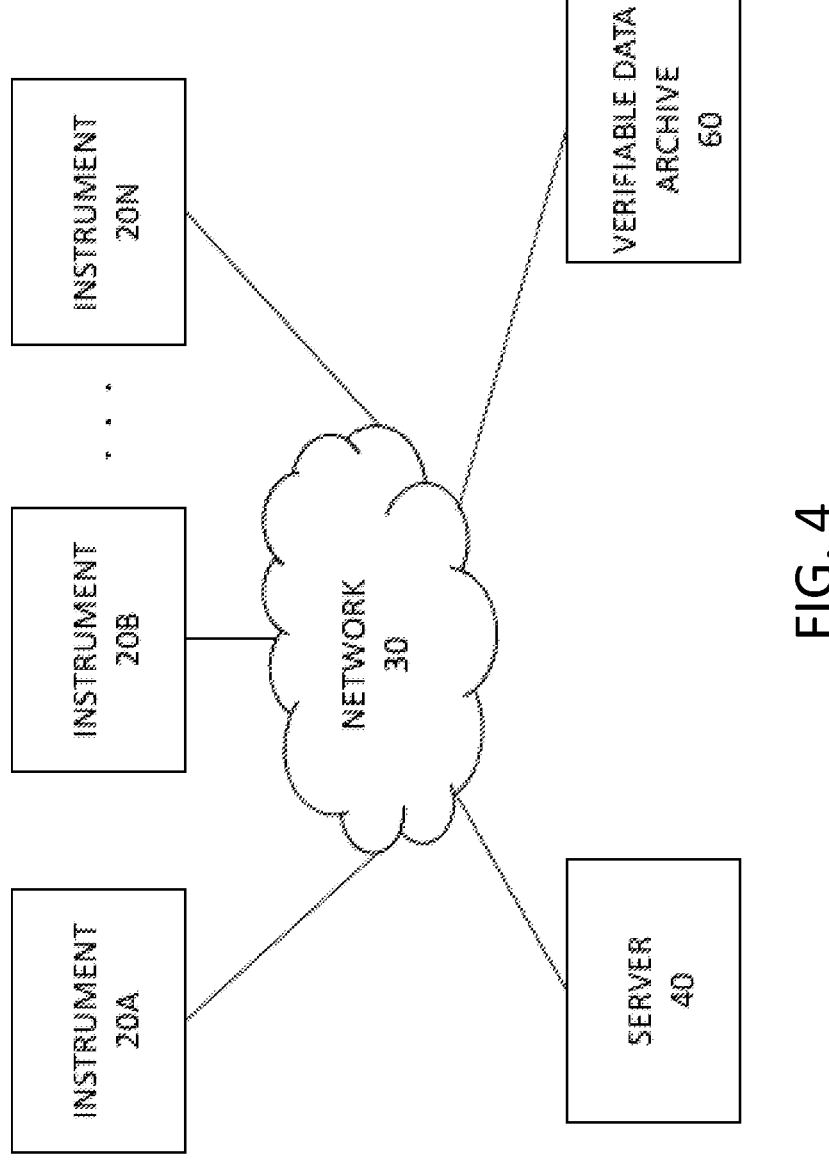
FIG. 4 illustrates a plurality of instruments for performing cell operations connected to a verifiable data archive.

FIG. 4 illustrates a verifiable data integrity archive for a plurality of networked instruments 20A-20N for performing cell operations. The archive 60 is connected to the network 30 as is server 40 which controls the storage of data in the archive. The server has a processor which can perform encryption and hashing operations on data and which can produce a time stamp. The archive can store encrypted data, hashed data, and/or hashed encrypted data along with a time stamp to provide verification of the integrity of the data.

Figure 5:
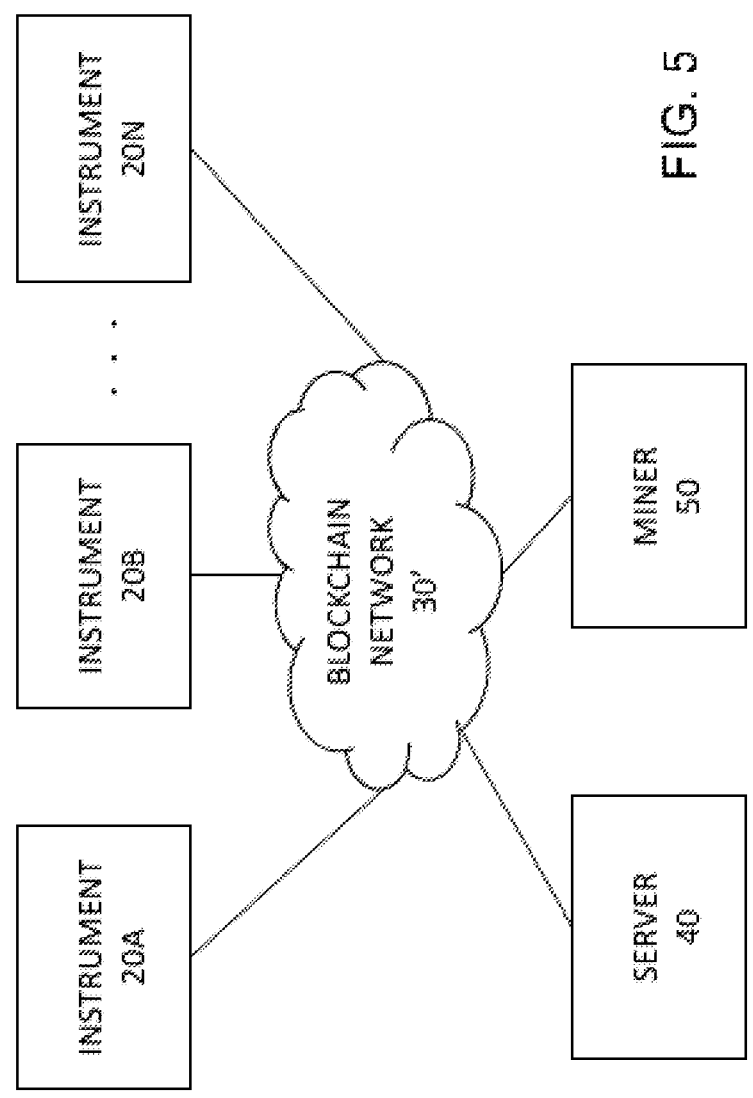
FIG. 5 illustrates a plurality of instruments for performing cell operations connected to a blockchain network.

FIG. 5 illustrates a plurality of instruments 20A-20V networked in blockchain network 30'. The network also includes a server for providing access to the network. One or more miners 50 are connected to the network to implement a consensus mechanism for adding blocks to the blockchain. One consensus mechanism is proof of work, although others can be used. In addition the mining can be performed by the instruments themselves.

Figure 6:
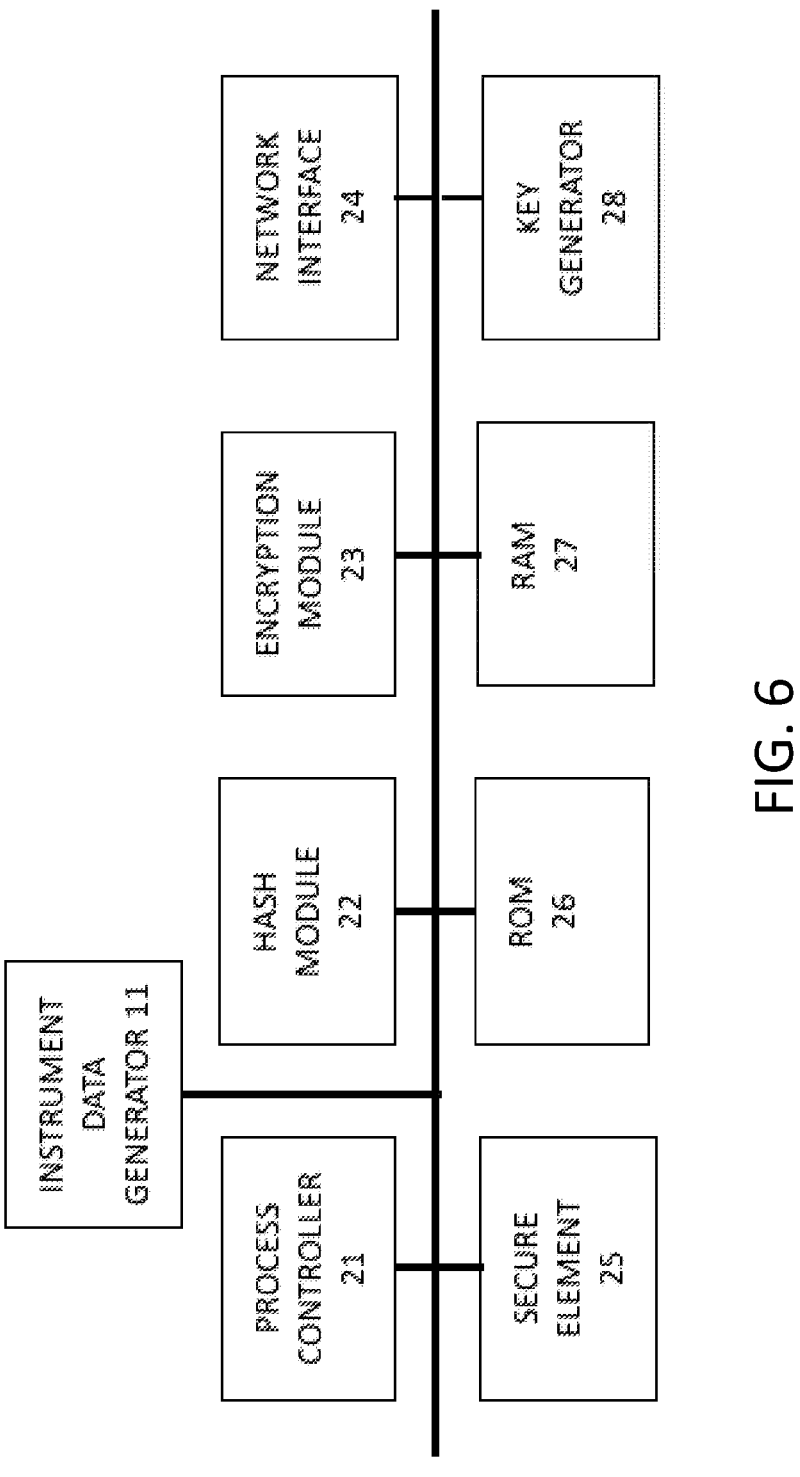
FIG. 6 illustrates the architecture of an instrument for performing cell operations which is usable in the network of FIG. 5.

By way of example, the architecture for an instrument is shown in FIG. 6. The instrument itself generates data when performing cell operations and that generator is generically identified as generator 11. The instrument includes a process controller 21 which operates in conjunction with ROM 26 and RAM 27 to perform protocols on cells. A network interface 24 allows the instrument to communicate on network 30'. The instrument also includes an encryption module 23 for encrypting and decrypting data in accordance with the blockchain protocol and a hash module 22 for performing the required hash functions for the blockchain being implemented. For example, a popular hash is SHA256. A secure element 25 is provided to store instrument information that is to be protected from hackers such as a private key for encryption. The instrument also includes a key generator 28 which will be discussed in more detail.

In some embodiments it is desirable for the instrument operator to not know the private key associated with the instrument, but still allow the instrument to encrypt data. In this instance, data is stored in ROM 26, secure element 25 and/or other ROMs in the instrument that each individually do not constitute the private key, but when combined according to an equation or algorithm, create the private key. The key generator 28 receives the data from the ROMs and provides the private key to the encryption module when it is needed for encryption or decryption, but does not store the private key on the instrument.

In another embodiment, a public key is assigned to an instrument, but the server 40 provides the private key to the instrument whenever it is required for encryption or decryption. Alternatively, the server provides the data for the key generator to create the private key.

In a further embodiment, the server produces hierarchical deterministic key pairs for each instrument. For each encryption of data for storage on the blockchain, the server provides a unique public key/private key pair. In this manner, the instrument is never aware of what the next private key will be. The hierarchical deterministic keys are generated by a seed that is stored in the server, but which does not store the private keys themselves.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, e.g., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, e.g., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (e.g. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing, " "involving," "holding," and the like are to be understood to be open-ended, e.g., to mean including but not limited to.

Only the transitional phrases "consisting of" and "consisting essentially of" shall be closed or semi-closed transitional phrases, respectively, as set forth in the United States Patent Office Manual of Patent Examining Procedures, Section 2111.03.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method for performing operations on cells in an instrument comprising the steps of:
   controlling the performance of operations on cell samples wherein data relating to the operations is generated;
   associating a unique identifier with the instrument;
   encrypting the generated data with a key corresponding to the unique identifier; and
   creating a hash of one of the generated data and the encrypted generated data to enable verification of the integrity thereof; and
   storing the hash for later verification of data.

2. The method according to claim 1, wherein the unique identifier is a public key of a public key/private key pair and wherein the step of encrypting is performed using the private key.

3. The method according to claim 2, wherein the instrument includes one or more processors and read only memories and wherein the private key is derived from data stored in the read only memories.

4. The method according to claim 2, wherein the private key is stored remotely and supplied to the instrument for encryption.

5. The method according to claim 2, wherein the private key is derived from data stored in a secure element.

6. The method according to 1, further comprising providing a time stamp and combining the time stamp with the hash for the verification of the integrity of data.

7. The method according to claim 1, wherein the step of controlling is according to at least one protocol and wherein metadata is hashed.

8. The method according to claim 1, wherein the generated data includes image data.

9. The method according to claim 1, wherein the generated data includes metadata.

10. The method according to claim 9, wherein the metadata includes cell line identification data.

11. The method according to claim 9, wherein the metadata includes user identification data.

12. The method according to claim 1, wherein the verifiable data archive is a blockchain network.

13. The method according to claim 1, wherein the hash is published in a widely circulated and dated publication.

14. The method according to claim 13, wherein the publication is a private publication.

15. The method according to claim 13, wherein the publication is a government publication.

16. The method according to claim 1, wherein the instrument is a cell culture instrument.

17. The method according to claim 1, wherein the hash is transmitted by a network interface.

18. An instrument for performing operations on cells and having a unique identifier associated therewith, the instrument comprising:

at least one processor and memory connected thereto and having a program stored therein, wherein the at least one process or running the program is configured to control the performance of operations on cell samples wherein data relating to the operations is generated and wherein the at least one processor running the program is configured to encrypt the generated data with a key corresponding to the unique identifier, hash one of the generated data and the encrypted data to enable verification of the integrity thereof and store the hash for later verification of data.

19. The instrument according to claim 18, wherein the unique identifier is a public key of a public key/private key pair and wherein the at least one processor encrypts using the private key.

20. The instrument according to claim 19, wherein each at least one processor includes a read only memory and wherein at least one processor is configured to derive the private key from data stored in each read only memory.

21. The instrument according to claim 19, wherein the at least one processor is configured to receive the private key from remote storage for encryption.

22. The instrument according to claim 19, wherein the read only memory is a secure element.

23. The instrument according to claim 18, wherein at least one processor is configured to provide a timestamp and combine the timestamp with the hash for verification of the integrity of data.

24. The instrument according to claim 18, wherein the at least one processor is configured to run at least one protocol and wherein the at least one processor is configured to hash metadata produced during operation of the at least one protocol.

25. The instrument according to claim 24, wherein the metadata includes cell line identification data.

26. The instrument according to claim 24, wherein the metadata includes user identification data.

27. The instrument according to claim 18, wherein the generated data includes image data.

28. The instrument according to claim 18, wherein the generated data includes metadata.

29. The instrument according to claim 18, wherein the verifiable data archive is a blockchain network.

30. The instrument according to claim 18, wherein the hash is published in a widely circulated and dated publication.

31. The instrument according to claim 30, wherein the publication is a private publication.

32. The instrument according to claim 30, wherein the publication is a government publication.

33. The instrument according to claim 18, wherein the instrument is a cell culture instrument.

34. The instrument according to claim 18, further comprising a network interface for transmitting the hash.

* * * * *